(12) United States Patent
Lyu et al.

(10) Patent No.: US 11,042,451 B2
(45) Date of Patent: Jun. 22, 2021

(54) RESTORING DATA LOST FROM BATTERY-BACKED CACHE

(71) Applicant: International Business Machines Corporation, Armonk, NY (US)

(72) Inventors: Gang Lyu, Shanghai (CN); Yicheng Feng, Shanghai (CN); Feng Shao, Shanghai (CN); Si Cong Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 16/221,375

(22) Filed: Dec. 14, 2018

(65) Prior Publication Data

US 2020/0192765 A1    Jun. 18, 2020

(51) Int. Cl.
*G06F 11/00* (2006.01)
*G06F 11/14* (2006.01)
*G06F 11/20* (2006.01)

(52) U.S. Cl.
CPC ...... *G06F 11/1469* (2013.01); *G06F 11/1448* (2013.01); *G06F 11/1471* (2013.01); *G06F 11/2082* (2013.01)

(58) Field of Classification Search
CPC ............. G06F 11/1448; G06F 11/1469; G06F 11/1471; G06F 11/2082
See application file for complete search history.

(56) References Cited

U.S. PATENT DOCUMENTS 9,026,765 B1 * 5/2015 Marshak ............. G06F 12/0866
711/170
9,128,847 B2 * 9/2015 Ito ................. G06F 12/0246
9,141,505 B1   9/2015 Crow et al.
9,146,878 B1 * 9/2015 Cohen ................ G06F 11/14
2005/0228957 A1 * 10/2005 Satoyama ........... G06F 11/2082
711/162

(Continued)

FOREIGN PATENT DOCUMENTS

CN            102662802 A        5/2012

OTHER PUBLICATIONS

Inui, et al., "Method for Protecting Data in Non-Volatile Memory," IP.com No. IPCOM000039116D, Apr. 1, 1987.

*Primary Examiner* — Joshua P Lottich
(74) *Attorney, Agent, or Firm* — Nelson and Nelson; Daniel P. Nelson

(57) ABSTRACT

A method for recovering modified data lost from cache includes maintaining, in a cache of a primary storage system, a destage data structure indicating which modified data in the cache has been destaged. The method further maintains, in cache of a secondary storage system, a change recording data structure indicating which modified data has been replicated from the primary storage system to the secondary storage system. The method further merges the destage data structure with the change recording data structure to yield an updated change recording data structure. In the event modified data in the cache of the primary storage system is lost, the method utilizes the updated change recording data structure to determine which modified data in the secondary storage system is needed to restore the modified data lost from cache at the primary storage system. A corresponding system and computer program product are also disclosed.

20 Claims, 7 Drawing Sheets

(56) References Cited

U.S. PATENT DOCUMENTS

| | | |
|---|---|---|
| 2009/0327601 A1 | 12/2009 | Fienblit et al. |
| 2010/0174676 A1* | 7/2010 | Ash .................... G06F 11/1469 707/609 |
| 2012/0089795 A1* | 4/2012 | Benhase ............ G06F 11/1451 711/162 |
| 2013/0191578 A1 | 7/2013 | Goss et al. |
| 2014/0108345 A1* | 4/2014 | Brown ................ G06F 11/2082 707/624 |
| 2014/0219021 A1 | 8/2014 | Trantham |
| 2014/0269053 A1 | 9/2014 | Chen et al. |
| 2015/0193342 A1* | 7/2015 | Ohara ................ G06F 12/0802 711/120 |
| 2017/0206157 A1 | 7/2017 | Edgington et al. |
| 2017/0315873 A1 | 11/2017 | Alcorn et al. |

\* cited by examiner

RESTORING DATA LOST FROM BATTERY-BACKED CACHE

BACKGROUND

Field of the Invention

This invention relates to systems and methods for restoring data lost from battery-backed cache.

Background of the Invention

In an enterprise storage system such as the IBM DS8000™ enterprise storage system, a pair of servers may be used to access data in one or more storage drives (e.g., hard-disk drives and/or solid-state drives). During normal operation (when both servers are operational), the servers may manage I/O to different logical subsystems (LSSs) within the enterprise storage system. For example, in certain configurations, a first server may handle I/O to even LSSs, while a second server may handle I/O to odd LSSs. These servers may provide redundancy and ensure that data is always available to connected hosts. When one server fails, the other server may pick up the I/O load of the failed server to ensure that I/O is able to continue between the hosts and the storage drives. This process may be referred to as a "failover."

Each server in the storage system may include one or more processors and memory. The memory may include volatile memory (e.g., RAM) as well as non-volatile memory (e.g., ROM, EPROM, EEPROM, flash memory, local hard drives, local solid state drives, etc.). The memory may include a cache, such as a DRAM cache. Whenever a host (e.g., an open system or mainframe server) performs a read operation, the server that performs the read may fetch data from the storage drives and save it in its cache in the event it is needed again. If the data is requested again by a host, the server may fetch the data from the cache instead of fetching it from the storage drives, saving both time and resources. Similarly, when a host performs a write, the server that receives the write request may store the modified data in its cache, and destage the modified data to the storage drives at a later time. When modified data is stored in cache, the modified data may also be stored in battery-backed cache (also referred to herein as "non-volatile storage," or NVS) of the opposite server so that the modified data can be recovered by the opposite server in the event the first server fails.

When a storage system such as the IBM DS8000™ enterprise storage system experiences a power outage, the modified data in the battery-backed cache may be quickly copied under battery power to more persistent storage (e.g., a local disk drive, solid state drive, and/or flash drive). The energy in the backup battery needs to be sufficient to complete the copy process. If a battery is degraded, a copy process is not initiated quickly enough after the storage system begins operating on battery power, and/or the battery-backed cache is incorrectly sized, the battery may not have sufficient energy to complete the copy process. In such cases, data loss may result. When a cache loses power, there is currently no functionality to determine whether modified data was lost, how much modified data was lost, and/or which modified data was lost. This is because metadata in cache that describes the modified data may also be lost when power to the cache is interrupted.

In view of the foregoing, what are needed are systems and methods to determine, when a cache loses power, whether modified data was lost, how much modified data was lost, and/or which modified data was lost. In the event modified data was lost, such systems and methods will ideally enable recovery of the modified data.

SUMMARY

The invention has been developed in response to the present state of the art and, in particular, in response to the problems and needs in the art that have not yet been fully solved by currently available systems and methods. Accordingly, systems and methods have been developed for recovering modified data lost from cache. The features and advantages of the invention will become more fully apparent from the following description and appended claims, or may be learned by practice of the invention as set forth hereinafter.

Consistent with the foregoing, a method for recovering modified data lost from cache is disclosed. In one embodiment, such a method includes maintaining, in a cache of a primary storage system, a destage data structure indicating which modified data in the cache has been destaged. The method further maintains, in cache of a secondary storage system, a change recording data structure indicating which modified data has been replicated from the primary storage system to the secondary storage system. The method further merges the destage data structure with the change recording data structure to yield an updated change recording data structure. In the event modified data in the cache of the primary storage system is lost, the method utilizes the updated change recording data structure to determine which modified data in the secondary storage system is needed to restore the modified data lost from cache at the primary storage system.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
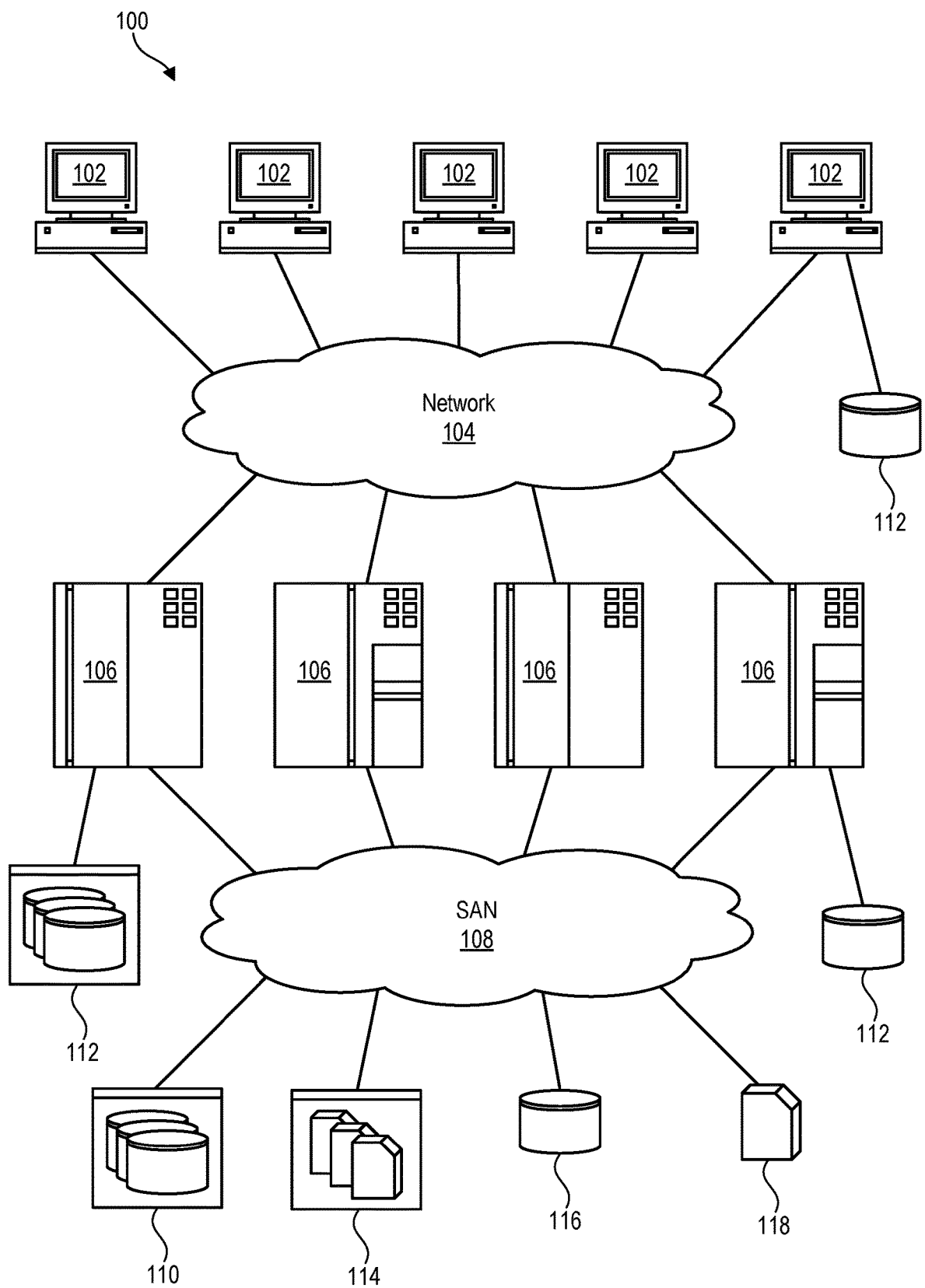
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard such as Fibre Channel (FC) or iSCSI.

Figure 2:
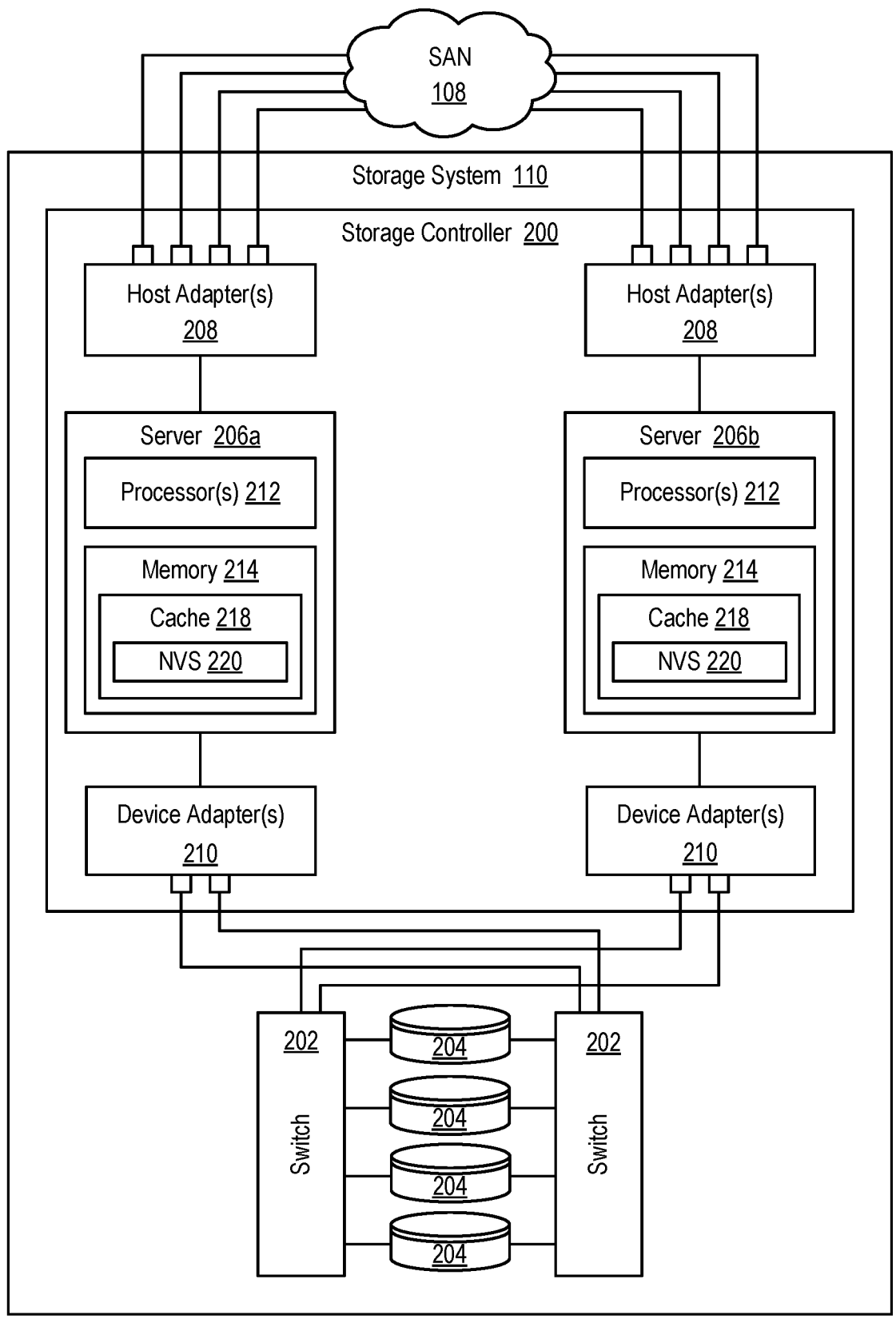
FIG. 2 is a high-level block diagram showing one example of a storage system for use in the network environment of FIG. 1.

Referring to FIG. 2, one embodiment of a storage system 110 containing an array of storage drives 204 (e.g., hard-disk drives and/or solid-state drives) is illustrated. The internal components of the storage system 110 are shown since the systems and methods disclosed herein may, in certain embodiments, be implemented within such a storage system 110, although the systems and methods may also be applicable to other storage systems. As shown, the storage system 110 includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed cache 218 in the opposite server 206.

When a storage system 110 such as that illustrated in FIG. 2 experiences a power outage, the modified data in the cache 218, and more particularly the NVS 220, may be quickly copied (also referred to as performing a "fire hose dump") under battery power to more persistent storage (e.g., a local disk drive, solid state drive, flash drive, etc.). Ideally, this copy process will complete before energy in the battery is depleted. It follows that the energy in the battery needs to be sufficient to complete the copy process. If a battery is degraded or the copy process is not initiated quickly enough after the storage system 110 begins operating on battery power, the battery 300 may not have sufficient energy to complete the copy process. In such cases, data loss may result. In such cases, modified data in the cache 218 may be all or partially lost.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
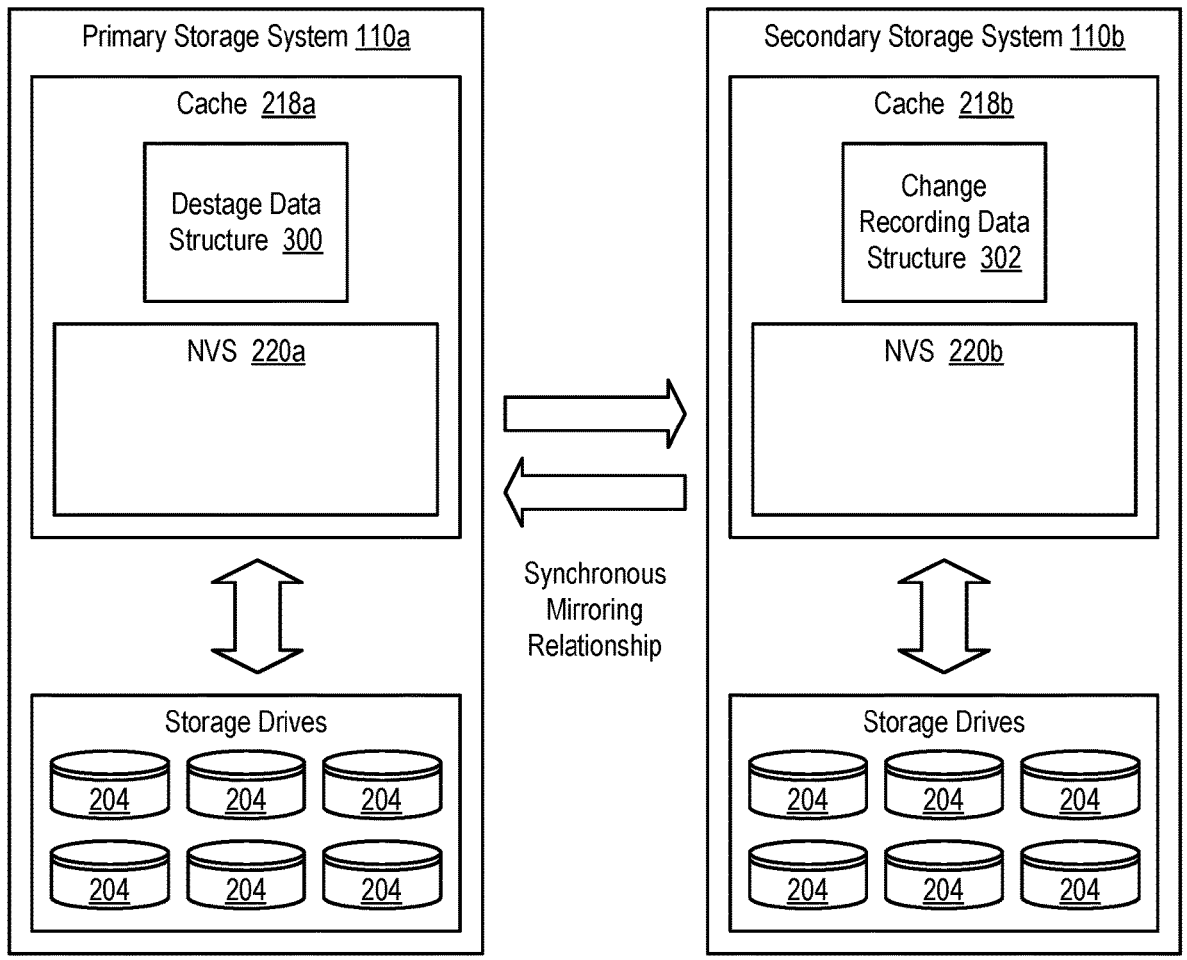
FIG. 3 is a high-level block diagram showing a pair of storage systems arranged in a synchronous mirroring relationship, as well as a destage data structure and change recording data structure in the cache of the storage systems.

Referring to FIG. 3, when a cache 218 and more particularly an NVS 220 loses power, there is currently no functionality to determine whether modified data was lost, how much modified data was lost, or which modified data was lost. This is because metadata in cache 218 that describes the modified data may also be lost when power to the cache 218 is interrupted. Thus, systems and methods are needed to determine, when a cache loses power, whether modified data was lost, how much modified data was lost, and/or which modified data was lost. In the event modified data was lost, systems and methods are needed to recover the modified data without needing to resort to long service windows or extraordinary measures (e.g., system-level data restoration, application-level rollbacks, etc.).

In certain cases, a pair of storage systems 110a, 110b may be configured in a synchronous mirroring relationship. In such an environment, data may be synchronously mirrored from a primary storage system 110a to a secondary storage system 110b to maintain two consistent copies of the data. The primary and secondary storage systems 110a, 110b may be located at different sites, perhaps hundreds or even thousands of miles away from one another. In the event the primary storage system 110a fails, I/O may be redirected to the storage system 110b, thereby enabling continuous operations. When the primary storage system 110a is repaired, I/O may be redirected back to the primary storage system 110a.

In order to recover modified data in the event it is lost from the cache 218a and more particularly the NVS 220a of the primary storage system 110a, various data structures may be maintained on the primary storage system 110a and secondary storage system 110b. These data structures may include a destage data structure 300 in the cache 218a of the primary storage system 110a and a change recording data structure 302 in the cache 218b of the secondary storage system 110b. The destage data structure 300 may record which storage elements (e.g., tracks) that have been written to cache 218a (and more particularly to the NVS 220a) have been destaged to backend storage drives 204 on the primary storage system 110a. The change recording data structure 302, by contrast, may record which storage elements (e.g., tracks) that have been written to cache 218a (and more particularly to the NVS 220a) of the primary storage system 110a have been replicated to the secondary storage system 110b.

In certain embodiments, the destage data structure 300 and change recording data structure 302 are implemented as bitmaps. In such embodiments, each bit in the bitmap may represent a storage element (e.g., track) of data. In the destage data structure 300, a bit that is set to "1" may indicate that the corresponding storage element of data has been destaged from the NVS 220 to the backend storage drives 204. Similarly, a bit that is set to "0" may indicate that the corresponding storage element of data has not been destaged from the NVS 220 to the backend storage drives 204. If a bit is set to "1" and the corresponding storage element is destaged again, the bit does not need to be set again. When a destage data structure 300 is initialized, each bit may be set to "0".

Similarly, in the change recording data structure 302, a bit that is set to "1" may indicate that the corresponding storage element of data has been replicated from the primary storage system 110a to the secondary storage system 110b. Similarly, a bit that is set to "0" may indicate that the corresponding storage element of data has not been replicated from the primary storage system 110a to the secondary storage system 110b. If a bit is set to "1" and the corresponding storage element is replicated from the primary storage system 110a to the secondary storage system 110b again, the bit does not need to be set again. When a change recording data structure 302 is initialized, each bit may be set to "0".

Figure 4:
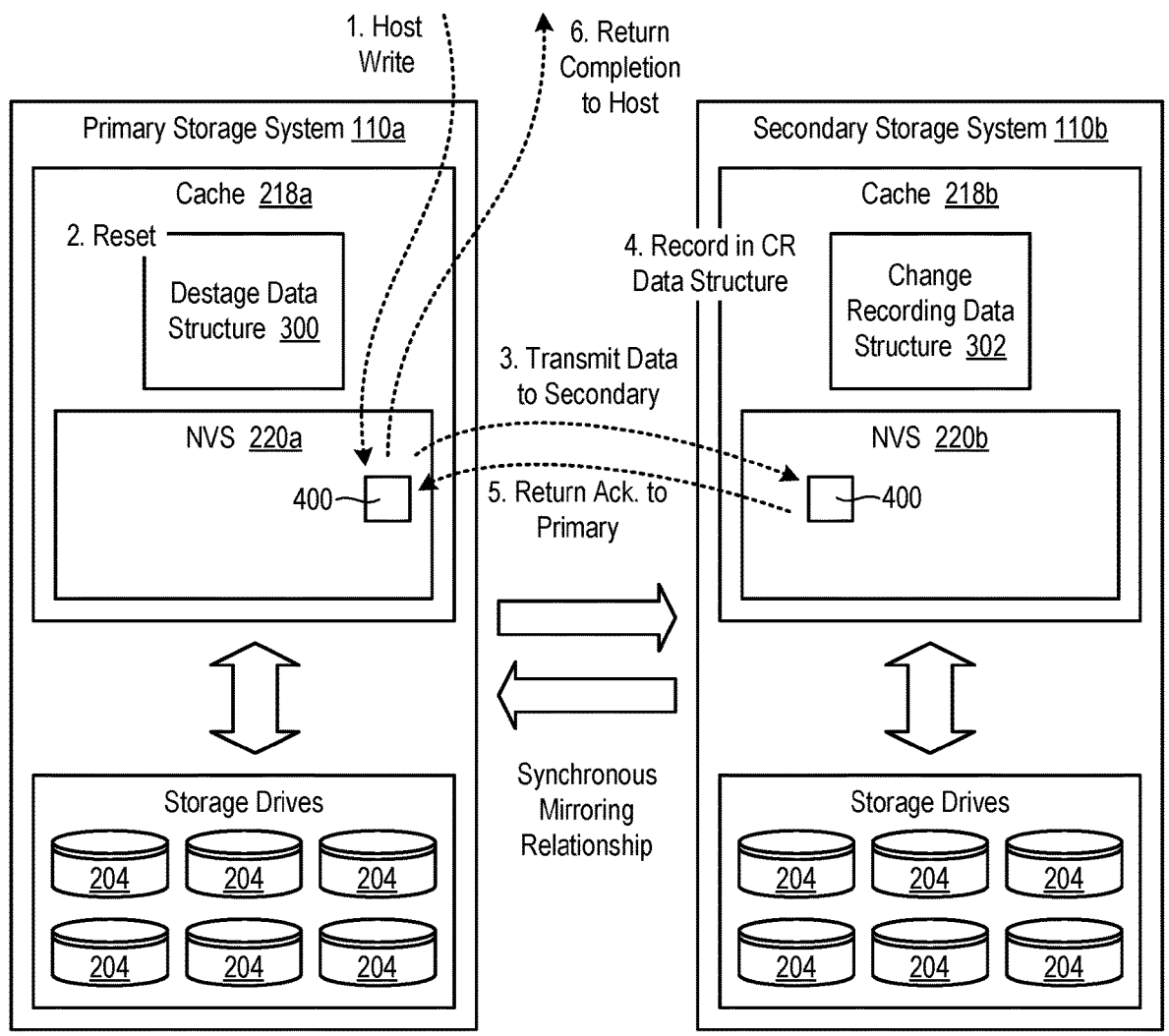
FIG. 4 is a high-level block diagram showing how the change recording data structure is used.

Referring to FIG. 4, a high-level block diagram is provided showing how the change recording data structure 302 may be used. The order of operations are numbered in the Figure. As shown, when a host write is (1) received by the primary storage system 110a, the modified data 400 associated with the write may be stored in cache 218a of the primary storage system 110a, and more particularly in NVS 220a of the primary storage system 110a. The storage element(s) associated with the modified data 400 may be (2) reset in the destage data structure 300 (if they are not already reset), such as by resetting corresponding bit(s) in the destage data structure 300 (if they are not already reset). A copy of the modified data 400 may then be (3) transmitted from the primary storage system 110a to the secondary storage system 110b. Once replicated, the storage element(s) associated with the modified data 400 may be (4) recorded in the change recording data structure 302, such as by setting the corresponding bit(s) in the change recording data structure 302. An acknowledgement may then be (5) returned from the secondary storage system 110b to the primary storage system 110a. At this point, the primary storage system 110a may (6) return completion status to the host system 106 that initiated the write operation.

Figure 5:
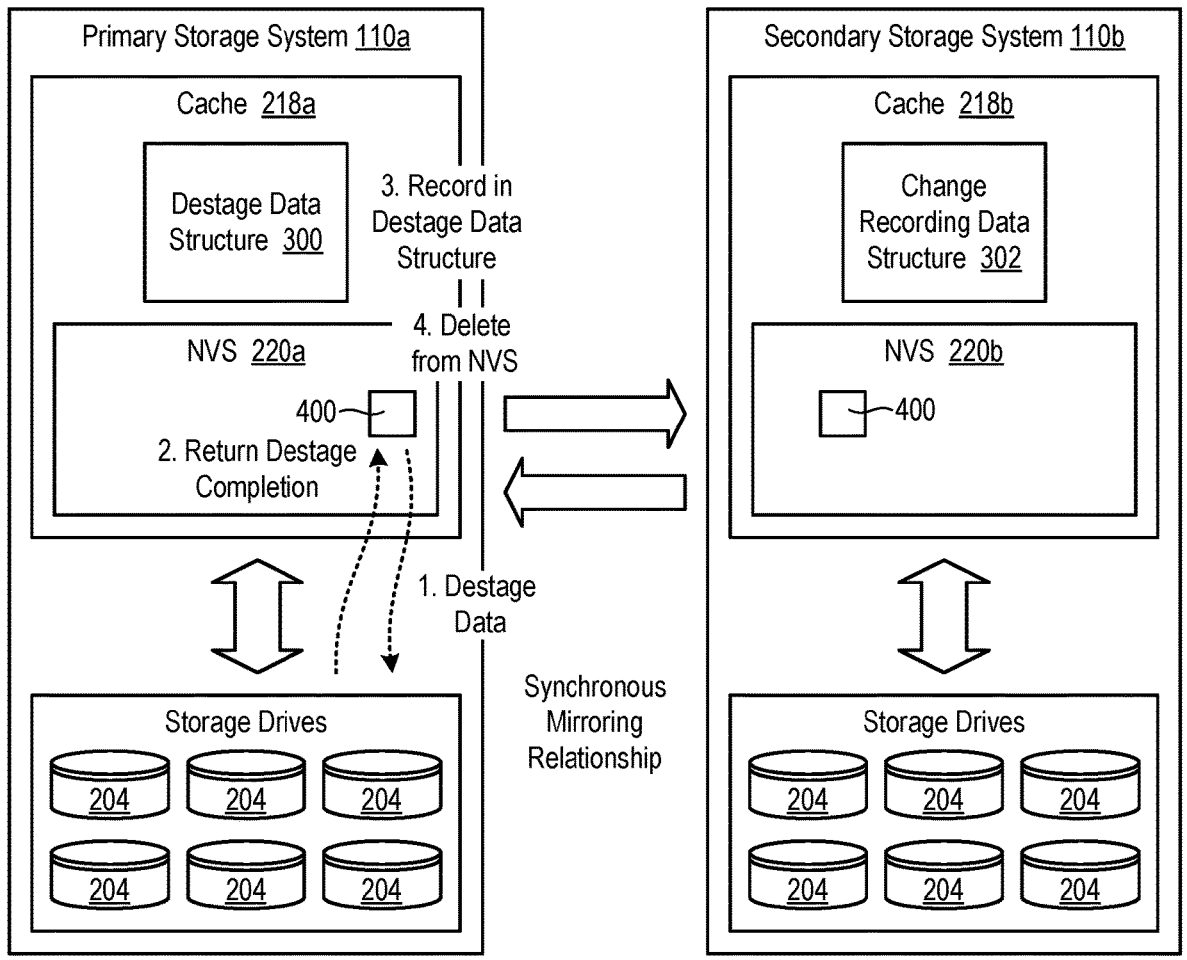
FIG. 5 is a high-level block diagram showing how the destage data structure is used.

Referring to FIG. 5, a high-level block diagram is provided showing how the destage data structure 300 may be used. The order of operations are numbered in the Figure. As shown, modified data is periodically (1) destaged from the cache 218a (and more particularly the NVS 220a) to the backend storage drives 204. When this occurs, completion status is (2) returned from the backend storage drives 204. Upon receiving the completion status, the storage elements associated with the destaged modified data are (3) recorded in the destage data structure 300, such as by setting the corresponding bits in the destage data structure 300, and the destaged data may be (4) deleted from the NVS 220a.

Figure 6:
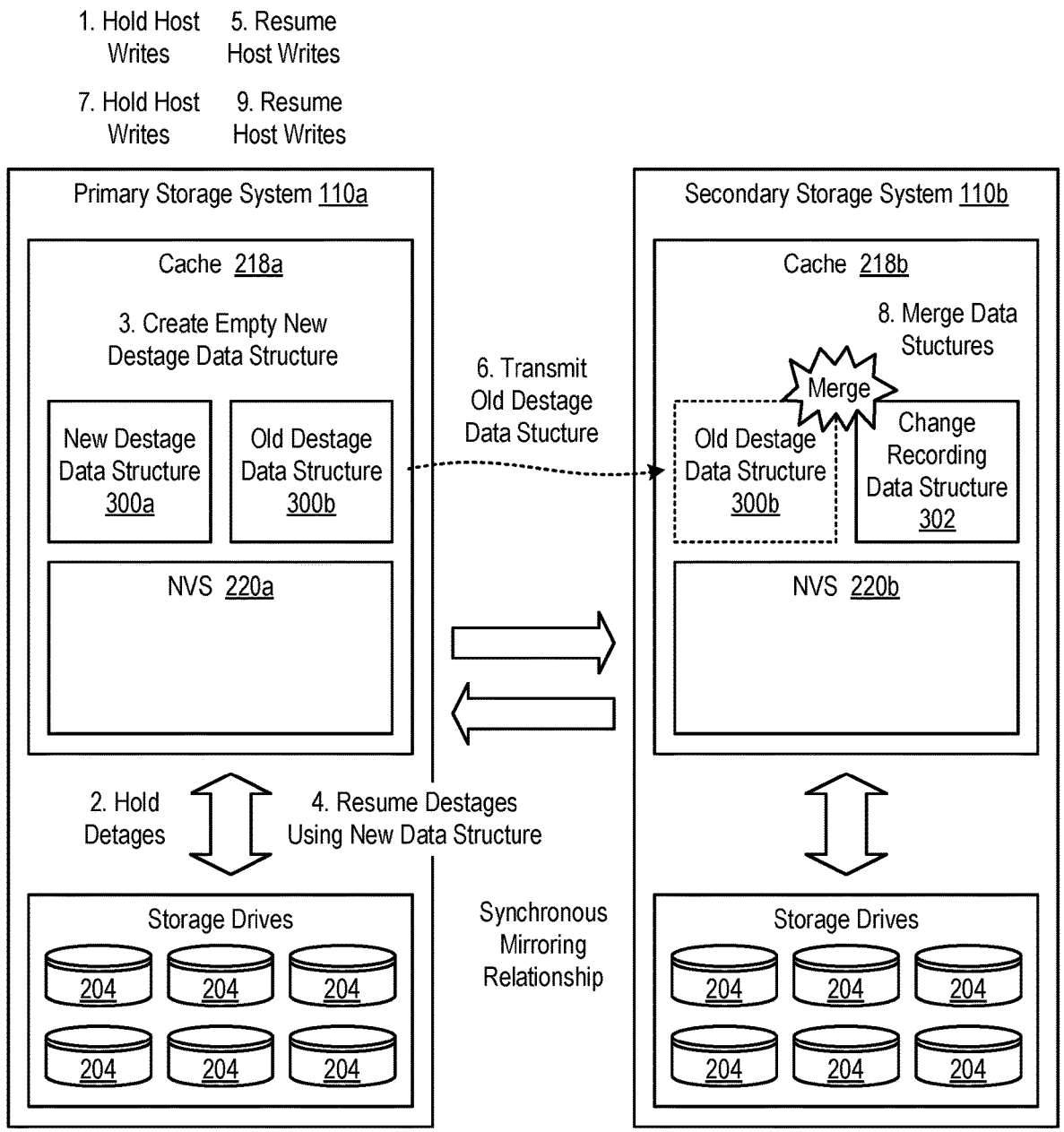
FIG. 6 is a high-level block diagram showing periodic merging of the destage data structure with the change recording data structure.

Referring to FIG. 6, the destage data structure 300 in the primary storage system 110a and the change recording data structure 302 in the secondary storage system 110b may be periodically coordinated and synchronized. FIG. 6 shows this coordination and synchronization process. As shown, in certain embodiments, the coordination and synchronization process may initially (1) hold (i.e., temporarily cease) host writes and (2) hold destages from the cache 218a to the backend storage drives 204. An empty new destage data structure 300a (e.g., a new destage data structure 300 with all bits set to "0") may then be (3) created in the cache 218a of the primary storage system 110a. The process may then (4) resume destages from the cache 218a to the backend storage drives 204 using the new destage data structure 300a to record the destages, and (5) resume host writes.

The old destage data structure 300b, which is no longer being used, may then be (6) transmitted from the primary storage system 110a to the secondary storage system 110b. The process may then (7) hold host writes (i.e., temporarily cease processing host writes) on the primary storage system 110a. The old destage data structure 300b may then be (8) merged with the change recording data structure 302 on the secondary storage system 110b. In the event the old destage data structure 300b and change recording data structure 302 are implemented as bitmaps, the merge may be performed by XORing the bitmaps together to yield an updated change recording data structure 302 on the secondary storage system 110b. In essence, this process updates the change recording data structure 302 to take into account data that has been destaged from cache 218a on the primary storage system 110a. Once the old destage data structure 300b is merged with the change recording data structure 302, host writes may be (9) resumed. The old destage data structure 300b may be discarded since it is no longer needed and the new destage data structure 300a is now being used to record destages on the primary storage system 110a.

The coordination and synchronization process shown in FIG. 6 may be performed periodically. In certain embodiments, the process may be performed at fixed time intervals, such as every five minutes. In other embodiments, the process may be performed when a specified amount of write data has been received by the primary storage system 110a and/or replicated to the secondary storage system 110b. In yet other embodiments, a minimum time interval (e.g., five minutes) and maximum time interval (e.g., ten minutes) may be established. In such embodiments, the coordination and synchronization process may be performed at a minimum every five minutes and at a maximum every ten minutes depending on the write workload received by the primary storage system 110a and/or replicated to the secondary storage system 110b.

Figure 7:
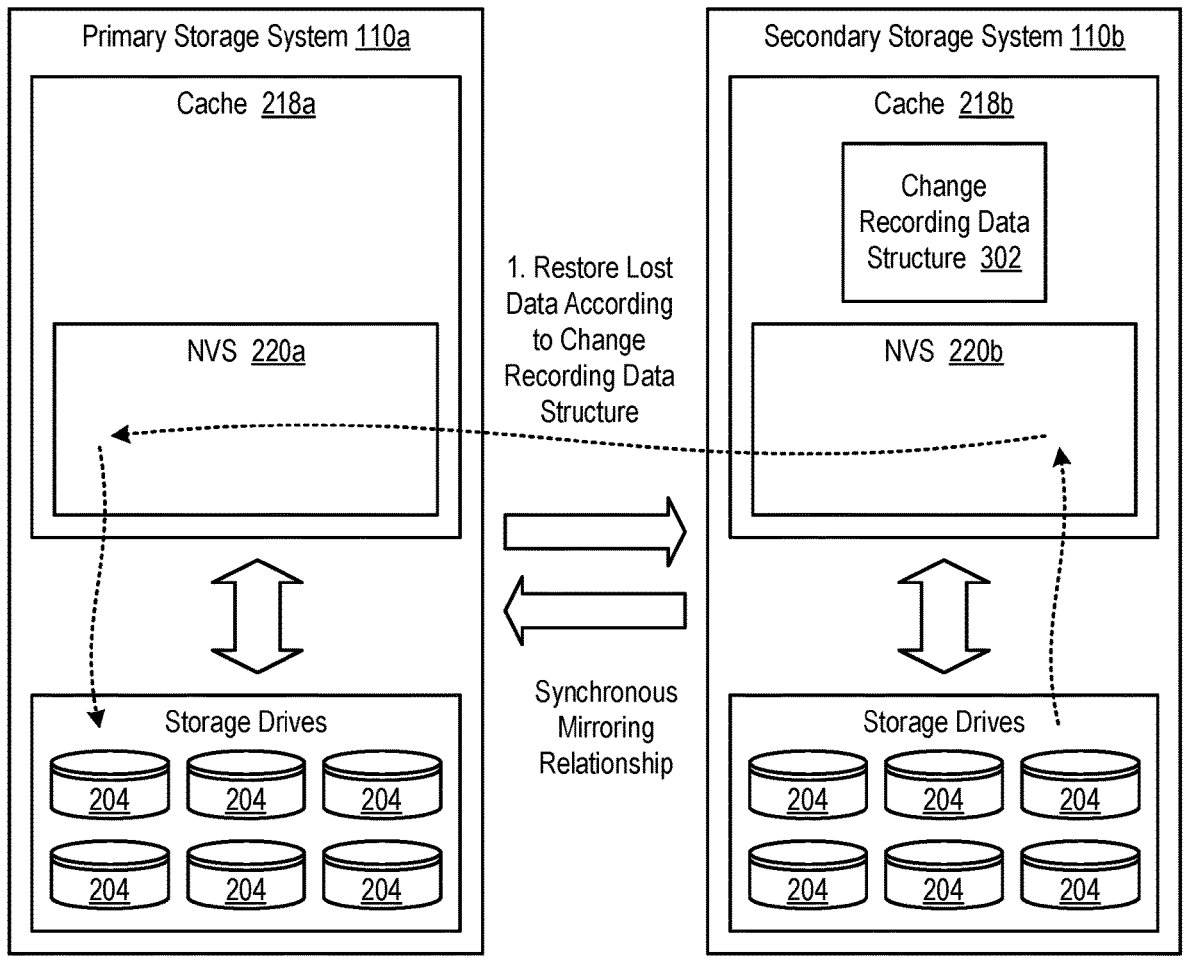
FIG. 7 is a high-level block diagram showing use of the change recording data structure to restore data to the primary storage system.

Referring to FIG. 7, in the event power to the cache 218 (and more particularly to the NVS 220) is interrupted before modified data contained therein can be dumped to more persistent storage, data loss may result. In such a scenario, the change recording data structure 302 on the secondary storage system 110b may be used to (1) restore the modified data from the secondary storage system 110b to the primary storage system 110a. As shown, the change recording data structure 302 may indicate which storage elements need to have their data copied from the secondary storage system 110b to the primary storage system 110a in order to restore the modified data that was lost from the cache 218a of the primary storage system 110a. The change recording data structure 302 may indicate whether modified data was lost, how much modified data was lost, and/or which modified data was lost, as well as enable recovery of the modified data from the secondary storage system 110b to the primary storage system 110a.

Although not shown, the systems and methods disclosed herein may also be used to restore data lost from cache 218b of the secondary storage system 110b. To achieve this, the cache 218b of the secondary storage system 110b may store a destage data structure 300 and the cache 218a of the primary storage system 110a may store a change recording data structure 302, which represents a mirror image of what is shown in the present disclosure. This will enable any modified data lost from cache 218b of the secondary storage system 110b to be restored from the primary storage system 110a in the same manner as previously described.

Similarly, one of skill in the art will recognize that a storage system 110b such as that illustrated in FIG. 2 may be divided into various logical partitions (LPARs). In such cases, a logical cache 218 and NVS 220 may be maintained and utilized for each logical partition. It follows that a destage data structure 300 and change recording data structure 302 may, in certain embodiments, be maintained for each logical partition. This destage data structure 300 and change recording data structure 302 may function in much the same way as described above except that they may be used at the level of the logical partition as opposed to the entire storage system 110.

The main failure paths for systems and methods in accordance with the invention are as follows:

In event the synchronous mirroring relationship is suspended, write data cannot be transferred to the secondary storage system 110b and the change recording data structure 302 in the secondary storage system 110b cannot be updated. In such a case, the coordination and synchronization process halts. After the synchronous mirroring relationship is resumed, an incremental resynchronization process transfers out-of-sync data from the primary storage system 110a to the secondary storage system 110b and the change recording data structure 302 is updated on the secondary storage system 110b. The coordination and synchronization process may then resume and return to normal status.

In the event a destage data structure 300 is corrupted, the corresponding change recording data structure 302 on the secondary storage system 110b may be discarded. Host writes to the primary storage system 110a may be held and a new change recording data structure 302 may be created on the secondary storage system 110b. Host writes may then be released to the primary storage system 110a. On the primary storage system 110a, detages from the NVS 220 to the storage drives 204 may be held, a new destage data structure 300 may be created, and destages may be released to the new destage data structure 300. The old corrupted destage data structure 300 may be discarded.

In the event a change recording data structure 302 is corrupted, the corresponding destage data structure 300 may be discarded. Host writes to the primary storage system 110a may then be held and a new change recording data structure 302 may be created on the secondary storage system 110b. On the primary storage system 110a, detages from the NVS 220 to the storage drives 204 may be held, a new destage data structure 300 may be created, and destages may be released to the new destage data structure 300. The old destage data structure 300 may be discarded.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for recovering modified data lost from cache, the method comprising:
   maintaining, in first cache of a primary storage system, a destage data structure indicating which modified data in the first cache has been destaged;
   maintaining, in second cache of a secondary storage system, a change recording data structure indicating which modified data has been replicated from the primary storage system to the secondary storage system;
   merging the destage data structure with the change recording data structure to yield an updated change recording data structure; and
   in the event modified data in the first cache is lost, utilizing the updated change recording data structure to determine which modified data in the secondary storage system is needed to restore the modified data lost from the first cache.

2. The method of claim 1, wherein the change recording data structure is a change recording bitmap.

3. The method of claim 1, wherein the destage data structure is a destage bitmap.

4. The method of claim 1, wherein the secondary storage system is in a synchronous mirroring relationship with the primary storage system.

5. The method of claim 1, further comprising, upon merging the destage data structure with the change recording data structure, creating a new destage data structure in the first cache.

6. The method of claim 1, wherein merging the destage data structure with the change recording data structure comprises merging the destage data structure with the change recording data structure at a predefined interval.

7. The method of claim 1, wherein merging the destage data structure with the change recording data structure comprises merging the destage data structure with the change recording data structure when an amount of modified data written to the first cache and/or replicated to the secondary storage system reaches a predefined threshold.

8. A computer program product for recovering modified data lost from cache, the computer program product comprising a computer-readable storage medium having computer-usable program code embodied therein, wherein the computer-readable storage medium is not a transitory signal, the computer-usable program code configured to perform the following when executed by at least one processor:
   maintain, in first cache of a primary storage system, a destage data structure indicating which modified data in the first cache has been destaged;
   maintain, in second cache of a secondary storage system, a change recording data structure indicating which modified data has been replicated from the primary storage system to the secondary storage system;
   merge the destage data structure with the change recording data structure to yield an updated change recording data structure; and
   in the event modified data in the first cache is lost, utilize the updated change recording data structure to determine which modified data in the secondary storage system is needed to restore the modified data lost from the first cache.

9. The computer program product of claim 8, wherein the change recording data structure is a change recording bitmap.

10. The computer program product of claim 8, wherein the destage data structure is a destage bitmap.

11. The computer program product of claim 8, wherein the secondary storage system is in a synchronous mirroring relationship with the primary storage system.

12. The computer program product of claim 8, wherein the computer-usable program code is further configured to, upon merging the destage data structure with the change recording data structure, create a new destage data structure in the first cache.

13. The computer program product of claim 8, wherein merging the destage data structure with the change recording data structure comprises merging the destage data structure with the change recording data structure at a predefined interval.

14. The computer program product of claim 8, wherein merging the destage data structure with the change recording data structure comprises merging the destage data structure with the change recording data structure when an amount of modified data written to the first cache and/or replicated to the secondary storage system reaches a predefined threshold.

15. A system for recovering modified data lost from cache, the system comprising:
   at least one processor;
   at least one memory device operably coupled to the at least one processor and storing instructions for execution on the at least one processor, the instructions causing the at least one processor to:
   maintain, in first cache of a primary storage system, a destage data structure indicating which modified data in the first cache has been destaged;
   maintain, in second cache of a secondary storage system, a change recording data structure indicating which modified data has been replicated from the primary storage system to the secondary storage system;
   merge the destage data structure with the change recording data structure to yield an updated change recording data structure; and
   in the event modified data in the first cache is lost, utilize the updated change recording data structure to determine which modified data in the secondary storage system is needed to restore the modified data lost from the first cache.

16. The system of claim 15, wherein the change recording data structure is a change recording bitmap and the destage data structure is a destage bitmap.

17. The system of claim 15, wherein the secondary storage system is in a synchronous mirroring relationship with the primary storage system.

18. The system of claim 15, wherein the instructions further cause the at least one processor to, upon merging the destage data structure with the change recording data structure, create a new destage data structure in the first cache.

19. The system of claim 15, wherein merging the destage data structure with the change recording data structure comprises merging the destage data structure with the change recording data structure at a predefined interval.

20. The system of claim 15, wherein merging the destage data structure with the change recording data structure comprises merging the destage data structure with the change recording data structure when an amount of modified data written to the first cache and/or replicated to the secondary storage system reaches a predefined threshold.

* * * * *